US008145727B2

(12) United States Patent
Fisher et al.

(10) Patent No.: US 8,145,727 B2
(45) Date of Patent: Mar. 27, 2012

(54) NETWORK ACCESSIBLE MEDIA OBJECT INDEX

(75) Inventors: Roberto Warren Fisher, Los Angeles, CA (US); Lisa Fredrickson, Oakland, CA (US); Chris Kalaboukis, Los Gatos, CA (US); Ronald Martinez, San Francisco, CA (US); Ian C. Rogers, Santa Monica, CA (US)

(73) Assignee: YAHOO! Inc., Sunnyvale, CA (US)

( * ) Notice: Subject to any disclaimer, the term of this patent is extended or adjusted under 35 U.S.C. 154(b) by 271 days.

(21) Appl. No.: 11/869,887

(22) Filed: Oct. 10, 2007

(65) Prior Publication Data

US 2009/0100151 A1 Apr. 16, 2009

(51) Int. Cl.
*G06F 15/16* (2006.01)
(52) U.S. Cl. .................................. 709/219; 707/999.01
(58) Field of Classification Search .................... 709/219
See application file for complete search history.

(56) References Cited

U.S. PATENT DOCUMENTS

| 6,441,291 B2 | 8/2002 | Hasegawa et al. |
| 6,578,047 B1 * | 6/2003 | Deguchi ........................ 707/104 |
| 6,822,153 B2 | 11/2004 | Comair et al. |
| 7,165,071 B2 * | 1/2007 | Fanning et al. .................. 707/10 |
| 7,200,586 B1 * | 4/2007 | Deguchi et al. .................... 707/3 |
| 7,279,629 B2 | 10/2007 | Hinman et al. |
| 2001/0025256 A1 * | 9/2001 | Oliphant et al. ................. 705/26 |
| 2003/0046703 A1 | 3/2003 | Knowles et al. |
| 2004/0078293 A1 * | 4/2004 | Iverson et al. ................... 705/27 |
| 2004/0128141 A1 | 7/2004 | Murase et al. |
| 2005/0120868 A1 | 6/2005 | Hinman et al. |
| 2005/0193094 A1 * | 9/2005 | Robbin et al. ................. 709/219 |
| 2005/0216417 A1 | 9/2005 | Risan et al. |
| 2006/0015573 A1 | 1/2006 | Hurst-Hiller et al. |
| 2006/0180007 A1 | 8/2006 | McClinsey |
| 2007/0033229 A1 * | 2/2007 | Fassett et al. ............... 707/104.1 |
| 2007/0055689 A1 * | 3/2007 | Rhoads et al. ................. 707/102 |
| 2007/0220430 A1 | 9/2007 | Sato |
| 2007/0288478 A1 * | 12/2007 | DiMaria et al. .................. 707/10 |
| 2009/0100062 A1 | 4/2009 | Fisher et al. |

OTHER PUBLICATIONS

Notification of Transmittal of the International Search Report and the Written Opinion of the International Searching Authority, or the Declaration, PCT Rule 44.1, International Application No. PCT/US2008/079154, Mailed May 28, 2009, 12 pages.
Translation of Korean Application No. KR 10-2006-0135692, Published Dec. 29, 2006, 13 pages.

(Continued)

*Primary Examiner* — Bunjob Jaroenchonwanit
(74) *Attorney, Agent, or Firm* — James J. DeCarlo; Greenberg Traurig, LLP

(57) ABSTRACT

A real-time locater for digital media objects, related to one or more creative compositions and accessible over a network, is described. A service-provider maintains a master index of the digital media objects. The master index is organized by considering each media object to be an example of a primary attribute associated with the media object by a multitude of users. The reference is constructed as a data structure of primary attributes and means of locating the media objects as instances of primary attributes. Each such media object may be further categorized by associating it with one or more secondary attributes. The data structure is augmented to provide for efficient location of media objects by relating secondary attributes.

16 Claims, 8 Drawing Sheets

OTHER PUBLICATIONS

Translation of Japanese Publication No. JP2001318949, Published Nov. 16, 2001, 1 page.

PCT Notification of Transmittal of the Intl. Search Report and the Written Opinion of the Intl. Searching Authority, or the Declaration, mailed Mar. 24, 2009, with regard to PCT/US2008/079159 filed Oct. 10, 2008.

Fisher et al., U.S. Appl. No. 11/869,926 Communication received from the U.S. Patent and Trademark Office dated Dec. 30, 2009.

Fisher et al., U.S. Appl. No. 11/869,926 Communication received from the U.S. Patent and Trademark Office dated Jul. 23, 2010, 32 pages.

* cited by examiner

NETWORK ACCESSIBLE MEDIA OBJECT INDEX

TECHNICAL FIELD

The present disclosure relates generally to distribution of multimedia content over interactive networks, and particularly, to an optimized mechanism for locating media objects accessible over the network.

BACKGROUND

As means of communication improve, users of communication devices connected in a network have an increased ability to consume multimedia content over the network. This disclosure relates generally to improved means of network access to media objects related to musical works.

Modern communication networks are typically hierarchical transmission networks with multiple layers of transmission protocols. A transmission network is a system that allows two or more transceivers to exchange data, whereas a transmission protocol is a sequence of standard interactive steps that facilitate the exchange. Typically, the lowest level protocols are more concretely tied to the interaction of physical circuitry, whereas higher levels of protocols are more abstract to facilitate higher level processing at an algorithmic level. For example, in the vernacular "the web," also known as "the Internet," has become shorthand for a multi-layer computer communications system, which combines higher level protocols for access, mid-level protocols, such as a means of locating resources available on the network through a system of uniform resource locaters (URLs), and low-level hardware protocols which control the exchange of large, uneven blocks of data by breaking them into smaller, standardized packets. Users seek improved means to locate and consume musical works on the Internet, and to share information concerning those works with other users, without the burden of managing lower-level protocols or learning new programming languages.

Users communicating over a network typically use a physical device, such as a telephone, a text messenger, a cell phone, a personal digital assistant (PDA), a networked music/video player, a personal computer, or a public terminal, to interconnect with service providers and other users on the network. A typical network user utilizes a number of application programs to create or consume content on the network. Example application programs include a "media object player," a "music player", and a "browser".

A browser is an application program that is generally intended to display "web pages." A web page is typically a two-dimensional image appearing as an individual page of information including one or more types of contained media. This multimedia content appears in a virtual book format, which typically is displayed as an individually framed "web page" along with means for navigating to other related web pages. The multimedia content may be directly perceived on the web page or may be indirectly accessible. Directly perceived content on the page may include displayed images, videos, or a media object player rendered within the image of the page. Examples of indirect access include access through a pop-up window, through an auxiliary media object player program, or access provided through a link to the location of another page. Many web pages incorporate one or more "hot links." The hot link enables a content consumer to access another web page or another application by using a pointing device to locate and click on the link.

A media object player is typically a software program on a computer including a user interface for perceiving a media object. Examples of stand-alone media object players include Microsoft's Windows Media Player®, Apple Inc.'s QuickTime®, and Real Networks Inc.'s RealPlayer®. A typical media object player is able to render various forms of media content, including audio recordings, video recordings, and compressed recordings.

A networked media object player may also be implemented as a combination of software routines for network access and a dedicated hardware device, with one or more rendering components included in the hardware device. Examples include Sansa's Connect® player, the Sony Network Walkman®, and Microsoft's Zune® player. Network users who are media object consumers frequently purchase audio and video media objects online for their portable players.

In the last 20 years, the music distribution industry has evolved. Formerly, a consumer typically purchased an analog copy of a musical video, album, or single from a traditional brick-and-mortar store. Music sales were dominated by sales of vinyl and compact disc (CD) albums. Today, the music industry is dominated by Internet sales of a variety of digital media objects related to musical works, which are typically accessed from online computer server systems. The digital media objects include digitized audio recordings, and may include additional media objects such as video recordings, song lyrics, cover and other album art, interviews with the artist, fan pictures, and so on. A consumer may purchase their own copy of a digital media object through an Internet service provider, such as Apple iTunes®, or may purchase access rights to a subscription service, such as Yahoo! Music Engine®. Alternatively, a consumer may access media objects which are freely available on the Internet, such as a promotional song on an artist's website, or access media objects supported by an alternative business model, such as by provider-included advertising.

Further, modern consumer preferences tend toward the purchase of individual songs and relative sales of musical albums have plummeted. In the typical transaction, the modern consumer is more likely to consider the unit of consumption as an individual song, equating the primary concept of a musical work as the concept of an individual song. The consumer seeks improved access to a plurality of songs, and to share his or her accessed songs with fellow consumers.

A first user sharing a song with a second network user may encounter difficulties. Typically, a consumer license for a digital media object related to a musical work does not allow direct transfers of that media object to other consumers. Instead, the second user typically must be provided with a reference to the media object, such as a linking URL, with the network location of a service provider or an accessible copy of the media object.

Further, there may be restrictions on the use of a copy of the media object, such as geographical limitations on copy consumers. For example, a first user in the United States might enjoy the song entitled "The Glamorous Life" as written by "Prince" and performed by the artist "Sheila E." A second user in the United Kingdom may seek access to a copy of the same song. However, the second user may not be able to access the same copy of the media object as the first user. The second user might not be able to access the same servers as the first user, might not have the same subscription privileges as the first user, may have to seek a United Kingdom as opposed to a United States distributor, may be using a different media object player requiring a different format, and so on. The consumers seek improved means to locate and consume media objects related to songs on the Internet, and to share those media objects with other users, without the burden of managing various access protocols.

Typically, a user obtains each musical media object from a service provider on the web through the service provider's website. A user accessing a song may seek to access a song with similar characteristics. For example, a user of iTunes® may wish to listen to a second song by the artist "Sheila E." Typically, the service provider's search engine will only show songs available on their website, and the user has a limited ability to find other related media objects available on the web. The user seeks an improved ability to search over a plurality of service provider websites.

SUMMARY

A real-time locater for digital media objects, related to one or more songs and accessible over a network, is described. A service-provider maintains a master index of the digital media objects. The master index is organized by considering each media object to be an example of a primary attribute associated with the media object by a multitude of users. A set of unique primary concept attributes is determined and maintained. Each categorized media object is considered an instance of one of these primary attributes. The reference is constructed as a data structure of primary attributes and means of locating the media objects as instances of primary attributes. Each such media object may be further categorized by associating it with one or more secondary attributes. The data structure is augmented to provide for efficient location of media objects by relating secondary attributes. By using the master index and relational entries, a user is able to locate a plurality of copies of a digital media object accessible on the network, and better able to obtain personal access to one or more copies of the digital media object.

DETAILED DESCRIPTION

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

The following description sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the means used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers which can be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable computer-readable storage medium. A computer-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

Figure 1:
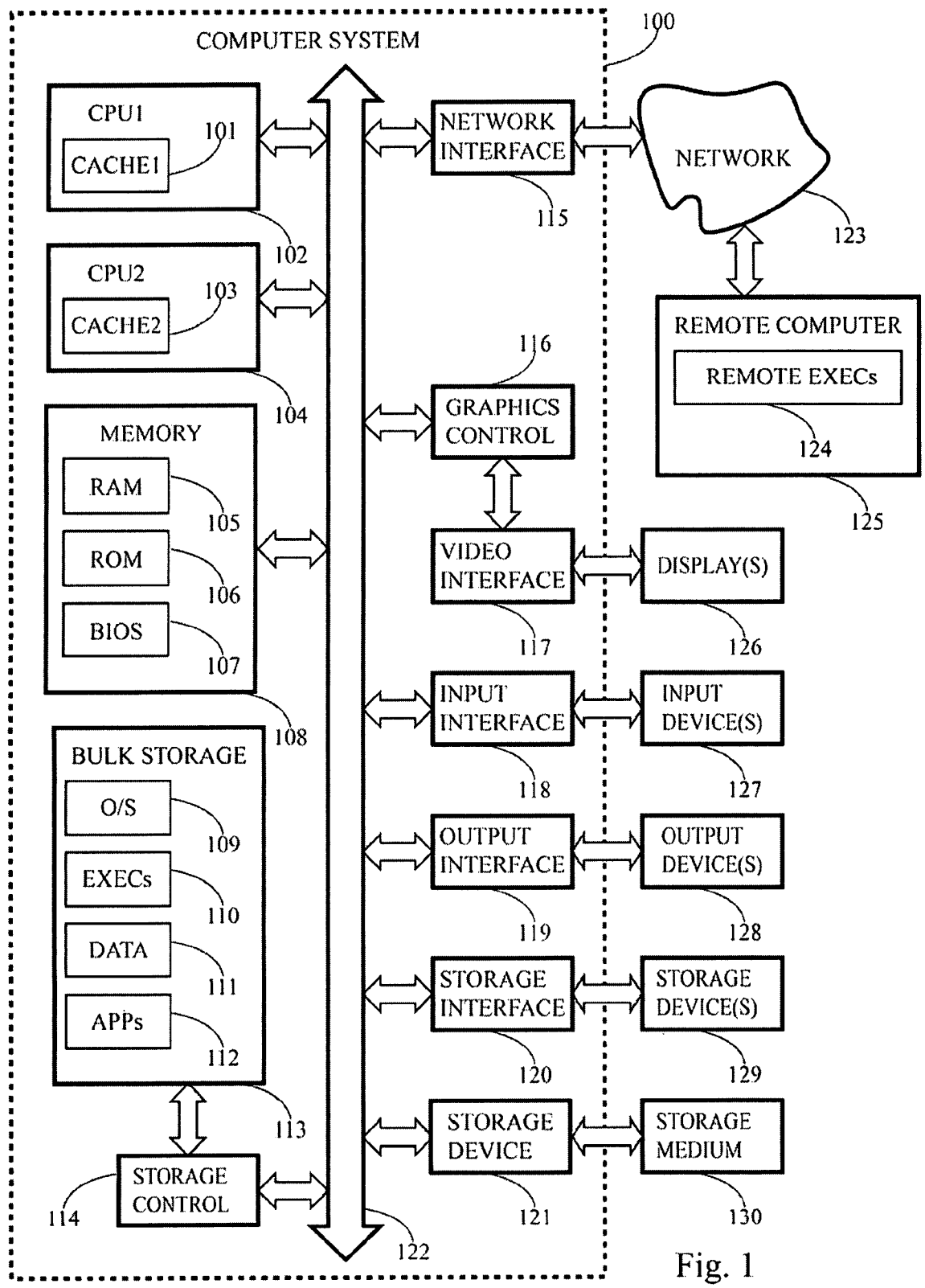
FIG. 1 is a block diagram of computer system architecture.

Server systems described herein can be implemented by a variety of computer systems and architectures. FIG. 1 illustrates suitable components in an exemplary embodiment of a general purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Computer system 100 accesses one or more applications and peripheral drivers directed to a number of functions described herein. Components of the computer system 100 may include, but are not limited to, a CPU or central processing unit 102, a system memory 108, and a system bus 122 that couples various system components including the system memory 108 to the processing unit 102. As used by those skilled in the art, a signal "bus" refers to a plurality of digital signal lines serving a common function. The system bus 122 may be any of several types of bus structures including a memory bus, a peripheral bus, and a local bus using any of a variety of bus architectures. By way of example, and not limitation, such architectures include Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

An operating system manages the operation of computer system 100, including the input and output of data to and from applications (not shown). The operating system provides an interface between the applications being executed on the system and the components of the system. According to one embodiment of the present invention, the operating system is a Windows® 95/98/NT/XP/Vista/Mobile operating system, available from Microsoft Corporation of Redmond, Wash. However, the present invention may be used with other suitable operating systems, such as an OS-X® operating system, available from Apple Computer Inc. of Cupertino, Calif., a UNIX® operating system, or a LINUX operating system.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can accessed by the computer system 100.

Communication media may also embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 108 includes computer storage media in the form of volatile and/or nonvolatile memory such as read only memory (ROM) 106 and random access memory (RAM) 105. A basic input/output system 107 (BIOS), containing the basic routines that help to transfer information between elements within computer system 100, such as during start-up, is typically stored in ROM 106 and other nonvolatile storage, such as flash memory. Additionally, system memory 108 may contain some or all of the operating system 109, the application programs 112, other executable code 110 and program data 111. Memory 108 typically contains data and/or program modules that are immediately accessible to and/or presently being operated on by CPU 102. Optionally, a CPU may contain a cache memory unit 101 for temporary local storage of instructions, data, or computer addresses.

The computer system 100 may also include other removable/non-removable, volatile/nonvolatile computer storage media. By way of example only, FIG. 1 illustrates a bulk storage 113 that reads from or writes to one or more magnetic disk drives of non-removable, nonvolatile magnetic media, and storage device 121 that may be an optical disk drive or a magnetic disk drive that reads from or writes to a removable, a nonvolatile storage medium 130 such as an optical disk or a magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. Bulk storage 113 and the storage device 121 may be connected directly to the system bus 122, or alternatively may be connected through an interface such as storage controller 114 shown for bulk storage 113. Storage devices may interface to computer system 100 through a general computer bus such as 122, or may interconnect with a storage controller over a storage-optimized bus, such as the Small Computer System Interface (SCSI) bus, the ANSI ATA/ATAPI bus, the Ultra ATA bus, the FireWire (IEEE 1394) bus, or the Serial ATA (SATA) bus.

The storage devices and their associated computer storage media, discussed above and illustrated in FIG. 1, provide storage of computer-readable instructions, executable code, data structures, program modules and other data for the computer system 100. In FIG. 1, for example, bulk storage 113 is illustrated as storing operating system 109, application programs 112, other executable code 110 and program data 111. As mentioned previously, data and computer instructions in 113 may be transferred to system memory 108 to facilitate immediate CPU access from processor 102. Alternatively, processor 102 may access stored instructions and data by interacting directly with bulk storage 113. Furthermore, bulk storage may be alternatively provided by a network-attached storage device (not shown), which is accessed through a network interface 115.

A user may enter commands and information into the computer system 100 through the network interface 115 or through an input device 127 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU 102 through an input interface 1118 that is coupled to the system bus, but may be connected by other interface and bus structures, such as a parallel port, a game port or a universal serial bus (USB). A display 126 or other type of video device may also be connected to the system bus 122 via an interface, such as a graphics controller 116 and a video interface 117. In addition, an output device 128, such as headphones, speakers, or a printer, may be connected to the system bus 122 through an output interface 119 or the like.

The computer system 100 may operate in a networked environment using a network 123 to one or more remote computers, such as a remote computer 125. The remote computer 125 may be a terminal, a personal computer, a server, a router, a network PC, a peer device or other common network node, and typically includes many or all of the elements described above relative to the computer system 100. The network 123 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 124 as residing on remote computer 125. It will be appreciated that the network connections shown are exemplary and other means of establishing a communications link between the computers may be used.

Collectively, these elements are intended to represent a broad category of computer systems, including but not limited to general purpose computer systems based on a member of the "x86" family of CPUs manufactured by Intel Corporation of Santa Clara, Calif., the x86-compatible CPUs manufactured by Advanced Micro Devices (AMD), Inc., of Sunnyvale, Calif., and the ARM CPU, originally designed by Advanced RISC Machines, Ltd., as well as any other suitable processor. Of course, other implementations are possible. For example, the server functionalities described herein may be implemented by a plurality of server sub-systems communicating over a backplane.

Various components of computer system 100 may be rearranged, deleted, or augmented. For example, system bus 122 may be implemented as a plurality of busses interconnecting various subsystems of the computer system. Furthermore, computer system 100 may contain additional signal busses or interconnections between existing components, such as by adding a direct memory access unit (not shown) to allow one or more components to more efficiently access system memory 108.

As shown, CACHE1 and CPU1 are packed together as "processor module" 102 with processor CPU1 referred to as the "processor core." Alternatively, cache memories 101, 103, contained in 102, 104 may be separate components on the system bus. Furthermore, certain embodiments of the present invention may not require nor include all of the above components. For example, some embodiments may include a smaller number of CPUs, a smaller number of network ports, a smaller number of storage devices, or a smaller number of input-output interfaces. Furthermore, computer system 100 may include additional components, such as one or more additional central processing units, such as 104, storage devices, memories, or interfaces. In addition, one or more components of computer system 100 may be combined into a specialized system-on-a-chip (SOC) to further system integration. In some computer system environments where component count is critical, the entire computer system may be integrated in one or more very large scale integrated (VLSI) circuit(s).

As discussed below, in one implementation, operations of one or more of the physical servers described herein is implemented as a series of software routines executed by computer system 100. Each of the software routines comprises a plurality or series of machine instructions to be executed by one or more components in the computer system, such as CPU 102. Initially, the series of instructions may be stored on a storage device, such as bulk storage 113. However, the series of instructions may be stored in an EEPROM, a flash device, or a DVD. Furthermore, the series of instructions need not be stored locally, and could be received from a remote computer 125 or a server on a network, via network interface 115.

Figure 2:
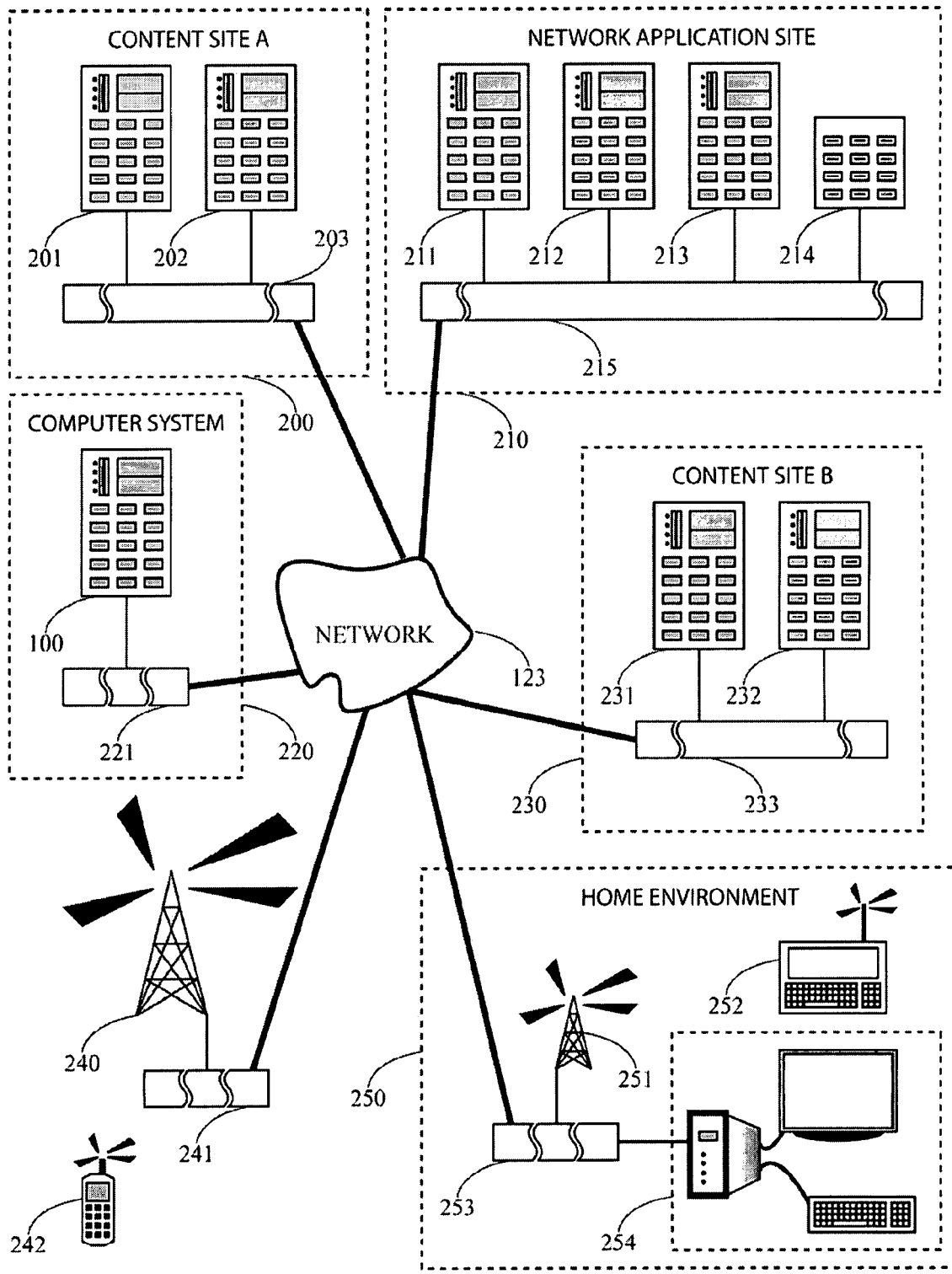
FIG. 2 illustrates an example network environment.

FIG. 2 illustrates computer system 100 placed in an example wide area network environment, such as the Internet. Network cloud 123 generally represents one or more interconnected networks, connecting computer system 100, a plurality of network sites, 200, 210, 220, 230, 240, and 250, and a plurality of client devices, 242, 251, 252, and 254. Network cloud 123 may include TCP/IP based wide area networks, private networks, wireless networks, satellite networks, cellular networks, paging networks, and the like. Client systems, such as portable device 242, portable computer 252, and personal computer 254 are connected to the wide area network environment through an internet service provider (not shown), a cellular provider 240, a wireless provider (not shown), a local wireless network 251, and/or a local wired network 253.

Computer system 100 is contained within the network site 220, where one or more computer systems, such as computer system 100, are connected to a local area network and router 221. The router 221 manages local computer communication traffic in network site 220 and interconnects with network cloud 123. Router 221 also functions to translate one or more local area network addresses in network site 220 to provide one or more unique corresponding wide area network addresses in order to facilitate communication between computer systems in network site 220 and other computer systems on the wide area network.

FIG. 2 illustrates a number of network service provider sites, including content site A 200, content site B 230, and network application site 210. The described invention may operate with one or more content providing or application sites. Although FIG. 2 illustrates the provider sites as separate local network sites, the functionality of each site may be combined with other sites. Further, a function for a particular site may be performed in a distributed computing environment by one or more computer systems at remote sites. Further still, the functionality represented by each depicted site may be further separated into a plurality of sub-function sites. In addition, implementations of the invention may operate in network environments that include multiples of one or more of the individual sites or subsystems of sites described herein. Implementations of the invention may also operate in network environments where one or more of the systems or sites described herein has been eliminated.

Content aggregation sites are represented by content site A 200 and content site B 230 in FIG. 2. Content is stored as digital data objects, which may include media objects or executable code objects. Content site A 200 is a network addressable system that allows users to access media objects supplied by one or more users. In one implementation, content site A 200 may be a media object aggregation or sharing system, such as Yahoo! Flickr® photo sharing site, YouTube.com, and similar variants. Content site A 200 comprises one or more physical server systems 201, 202, implemented using an architecture such as that of computer system 100, and containing or connected to one or more bulk storage systems, such as that of bulk storage system 113, or a network attached storage device (not shown), and a local area network and router 203. The one or more physical servers allow users to upload and download media objects. In one implementation, the functionality hosted by the one or more physical servers may include web or HTTP servers, FTP servers, and the like.

Content site B 230 is a network addressable system that allows users to access content supplied by one or more content suppliers (not shown). Content site B 230 comprises one or more physical server systems 231, 232 containing or connected to one or more bulk storage systems (not shown), and a local area network and router 233. The one or more physical servers 231, 232 allow the service provider (not shown) to determine and aggregate the locations of digital data objects available on the web. A user or another service provider on the web accesses Content Site B 230 to indirectly access digital data objects available from other sites.

Network application site B 210 is a network addressable system that allows users to access one or more executable code objects supplied by one or more service providers (not shown). Network application site B 210 comprises one or more physical server systems 211, 212, 213 containing or connected to one or more bulk storage systems, shown as network-attached storage device 214, and a local area network and router 215. Executable code objects may include code to be executed on a user device as well as code executed within a server system, such as server 212. An example of an executable code object is an informational web site where users request and receive identified web pages and other content over the network cloud 123. The executable code object may also be a posting forum, where users may submit or otherwise configure media objects to be perceived by other users. The executable code object may also be a social network application, such as a chat client or e-mail client. The executable code object may also be a web-posting application, allowing users to configure and maintain personal web pages. One or more executable code objects may also combine to form a content distribution application that displays available media objects and transmits them to users. Examples of network application sites include Yahoo! Music Engine®, Apple iTunes®, and podcasting servers.

In media object aggregation or sharing systems, such as the Yahoo! Flickr® photo sharing site, media objects are typically contained in data objects which also contain metadata related to the media object. For example, a data object containing a media object may also contain one or more meta keywords to identify related media objects. A photo sharer may upload a photo to a photo sharing site, and consider the photo related to a set of keywords, such as "artists," "musicians," "drummers," and "teen-idols." The photo sharer may further configure the media object by combining the media object with the set of related meta parameters in a data object.

In the context of a computer network, a "virtual server" is physically one or more server systems connected to the network and support circuitry to execute application programs which process data. Data may be stored by means which facilitate efficient processing, such as by storing the data in a "database" consisting of a collection of data organized by relationships between the various forms of data contained therein. When a virtual server consists of more than one computer server system, the set of computer server systems is interconnected hierarchically to perform high-level functions as combined functions of several servers under central control.

Functionally, a virtual server executes a sequence of low-level CPU commands to complete instructions for processing data. A virtual server typically accepts instructions and executes commands for a multitude of "clients". The instructions may include, but are not limited to, instructions to store or retrieve data, to modify, verify or erase data, or to reorganize data. A virtual server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient servers, such as a "jazz server," a "hip-hop server," a "classical server," and so on, to register paying user requests in a "billing server," to verify the identity, preferences, and access privileges of a user in a "registration server" and so on. The music server may therefore also be a client of other servers. Practitioners of the art will recognize that virtual servers and clients are abstract interactive devices controlled by software instructions, whose interaction protocols may be flexibly defined. A "client" as used herein may include functionality to process information and programs, as well as to issue commands. Similarly, a virtual server as used herein may include functionality to initiate commands to users and other servers as well as to respond to instructions.

Similarly, a database should not be construed to be a single physical collection of data. As used herein, a database is an abstract collection of data which may be distributed over one or more physical locations. Said data may be stored physically within a single or multiple servers, within attached physical device(s), network attached device(s), or user devices(s). Similarly, an application program should not be construed to be a single physical collection of commands. As used herein, an application program is an abstract collection of CPU commands, which may be physically executed, in whole or in part, within a single or multiple servers, within attached physical devices(s), within network attached device(s), or within user device(s).

A means of organizing an index to media objects available on a network is described. It is assumed that the media objects constitute a set of fundamentally related objects, in the sense that network users associated each of the media objects with a primary attribute (or concept) and one or more secondary attributes. As an example, a means of organizing media objects related to songs is discussed. In this environment, it is assumed that network users primarily associate each of the media objects with an underlying concept of a work, such as a song, a story, and the like. For didactic purposes, application of the invention to musical works is described below. In other implementations, the invention can be extended to other works, such as a story, where instances of the story can include movies, novels, and the like.

In the master index, each primary attribute describes a song as a combination of two or more constituent sub-identifiers. In one example implementation, the primary attribute of a song is the title of the song and the composer of the song. In a second example, the primary attribute of a song is the title of the song, the composer of the song, and the performer. The master index is described in terms of these examples for illustration and clarity only, but other combinations and numbers of constituent sub-identifiers may be utilized. For example, an alternative implementation of the invention defines the primary attribute of a song as a 4-tuple including the song title, the song composer, the song performer, and song production date.

With an appropriate definition of a song's primary attribute, steps to locating a consumable media object are streamlined. A network user may access the media object by referring directly to its primary attribute, rather than by referring indirectly to secondary characteristics, as elucidated below.

Further, a song, such as "Lyle Lovett performing If I Had a Boat," may have two or more versions of the same song available on the network, such as the version originally released on the CD album "Pontiac," an MP3-format version available on Yahoo! Music Service®, a streaming version available from RealNetworks, Inc. for its media player, RealPlayer®, an AIFF-format version available on Apple iTunes®, and so on. Further, access to various versions of the song may be subject to differing licensing agreements, geographic restrictions, available consumer subscriptions, and so on.

When two or more users attempt to access the same song, the users may have conflicting access privileges, preventing access to the same version of the song. In order to facilitate access to the song, a master index inputs the primary attribute of a song and efficiently locates an assortment of versions with various access privileges.

A user may also desire to access other media objects associated with a song. For example, many songs, such as "Lyle Lovett performing If I Had a Boat," were originally on albums, such as on the CD album "Pontiac." A user accessing a song may desire to access related media objects, such as a textual listing of song lyrics, album cover or booklet art, different song versions, songs on the same album, songs by the same artist(s), songs by the same composer(s), songs in the same genre, and so on. As described, the master index further provides a means to efficiently locate the related media objects.

Figure 3:
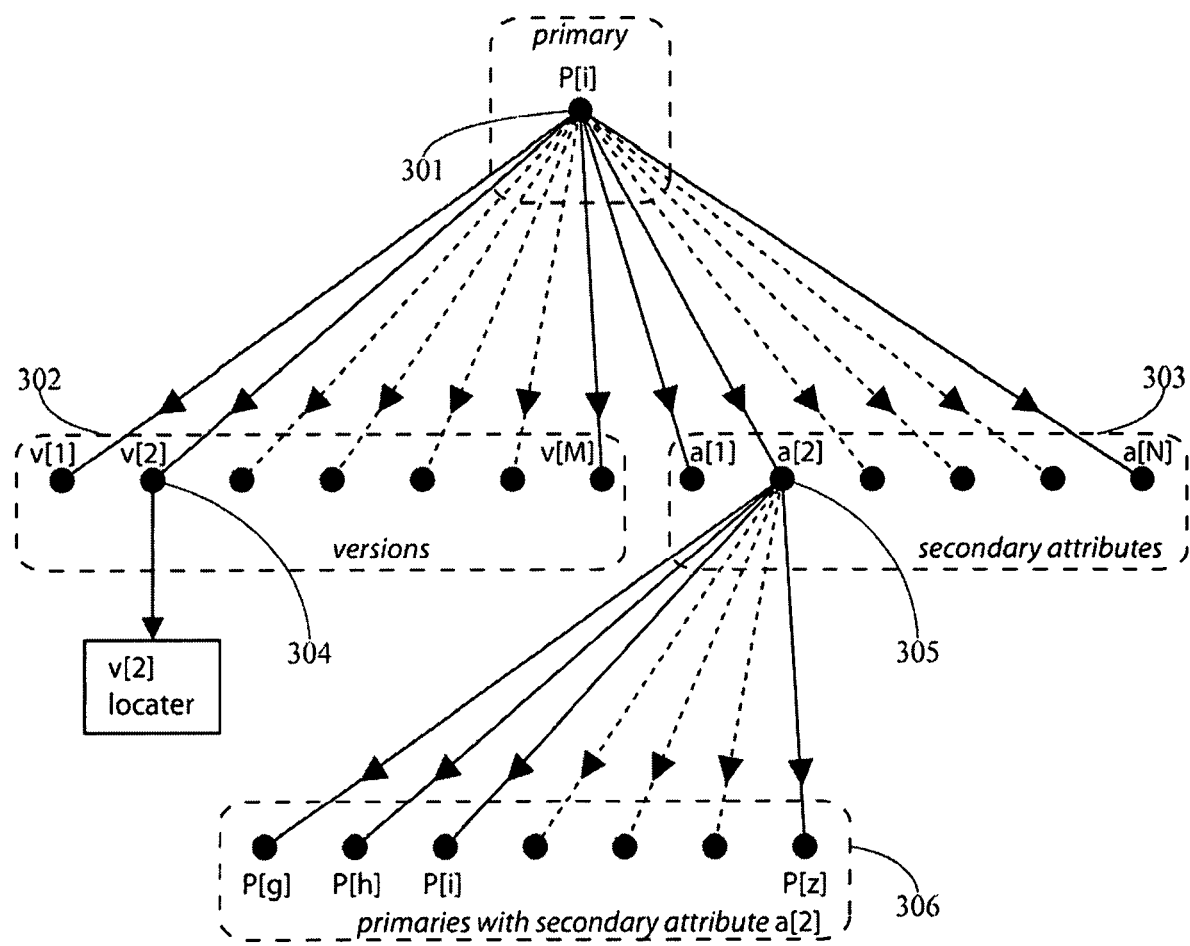
FIG. 3 illustrates a data structure for an example master index.

FIG. 3 illustrates an example data structure for an example song master index. In FIG. 3, the data structure is illustrated as interconnected nodes containing metadata. Nodes are labeled as primary nodes, version nodes, and secondary nodes. A node may contain descriptive metadata as well as one or more addresses of other nodes. When a node contains the address of another node, a directed line illustrates the link from a source-node containing the address of a destination-node. When a node contains the address of a media object available on the network, a directed line illustrates the link from a source-node containing the boxed network address of the media object.

Primary node 301 represents a specific song. When the primary characteristic of a song is defined as the song title and performer, the $i^{th}$ referenced primary node, P[i], may, for example, represent the song "Lyle Lovett performing If I Had a Boat."

A primary node is connected to one or more version nodes. In the example of FIG. 3, M versions of the $i^{th}$ song, P[i], are available on the network. The various versions are represented by a plurality of version nodes 302. Metadata for a particular example version, v[2], is shown in expanded node 304. The metadata contains information about the version, including a network locater for the version, shown here as an address of the location of the data file for the version v[2] on the Internet.

A primary node may optionally be connected to one or more secondary attribute nodes. In FIG. 3, N secondary attributes are identified with the $i^{th}$ song, P[i]. Metadata for the various secondary attributes are represented by a plurality of secondary nodes 303. For example, attribute a[1] may represent a song by Lyle Lovett, attribute a[2] may represent a song from the album Pontiac by Lyle Lovett, attribute a[3] may represent a song in the genre "country", attribute a[4] may represent a song from a Live in Texas album, and so on. Metadata for a particular secondary attribute, a[2], is shown in expanded node 305. The metadata in node 305 contains information about the secondary attribute, including one or more links to songs with the attribute, where each song is represented by a link to the primary node for that song. In this example, the secondary node a[2], representing a song from the album Pontiac, is linked to the primary nodes of other songs on the album Pontiac by Lyle Lovett, shown here as a plurality of primary nodes 306. The metadata in node 305 for secondary attribute a[2] may also contain a returning link to the primary song attribute, P[i], as shown.

In one embodiment, a secondary attribute node may also contain one or more links to other secondary attribute nodes [not shown]. For example, if attribute node a[1] represents songs by Lyle Lovett, and attribute a[2] represent songs from the album Pontiac by Lyle Lovett, a link from attribute node a[1] to attribute a[2] would serve to further identify that a secondary attribute may be a subset of another secondary attribute.

Figure 4:
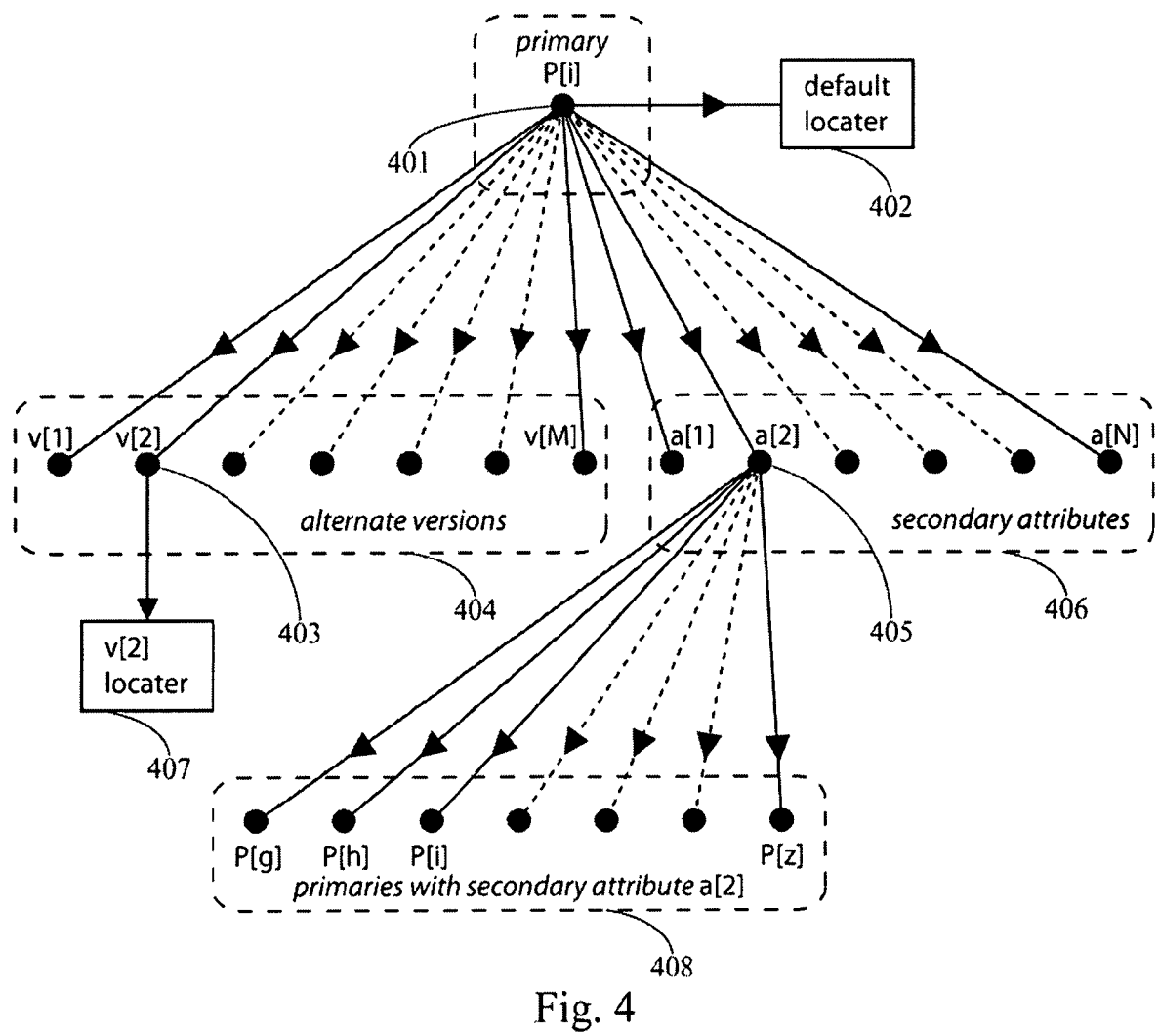
FIG. 4 illustrates an alternative data structure for an example master index.

FIG. 4 illustrates an alternate embodiment of a data structure for an example song master index. As in FIG. 4, the data structure is illustrated as interconnected nodes containing metadata, and directed links to indicate when a node contains the address of another node or a network media object. An advantage of the data structure of FIG. 4 is that it provides one-step translation from a consumer concept of a song to a default network location for the media object most commonly associated with the concept.

Primary node 401 represents a specific song. When the primary characteristic of a song is defined as the song title and performer, the $i^{th}$ referenced primary node, P[i], may, for example, represent the song "Lyle Lovett performing If I Had a Boat."

In FIG. 4, a primary node points to a default network location 402 for the song. In addition, a primary node may be connected to one or more alternate version nodes. In the example of FIG. 4, (M+1) versions of the $i^{th}$ song, P[i], are available on the network. The various versions are represented by a default locater 402 within primary node P[i], and a plurality of alternate version nodes 404. Metadata for a particular alternate version, v[2], is shown in expanded node 403. The metadata contains information about the version, including a network locater for the version, shown here as an address of the location 407 of the media object file for the version v[2] on the network. In FIG. 4, a primary node P[i] may also be connected to a plurality of secondary attribute nodes 406, and an example expanded secondary attribute node for a[2] 405 is illustrated as containing a plurality of links 408 to primaries with the secondary attribute a[2].

Figure 5:
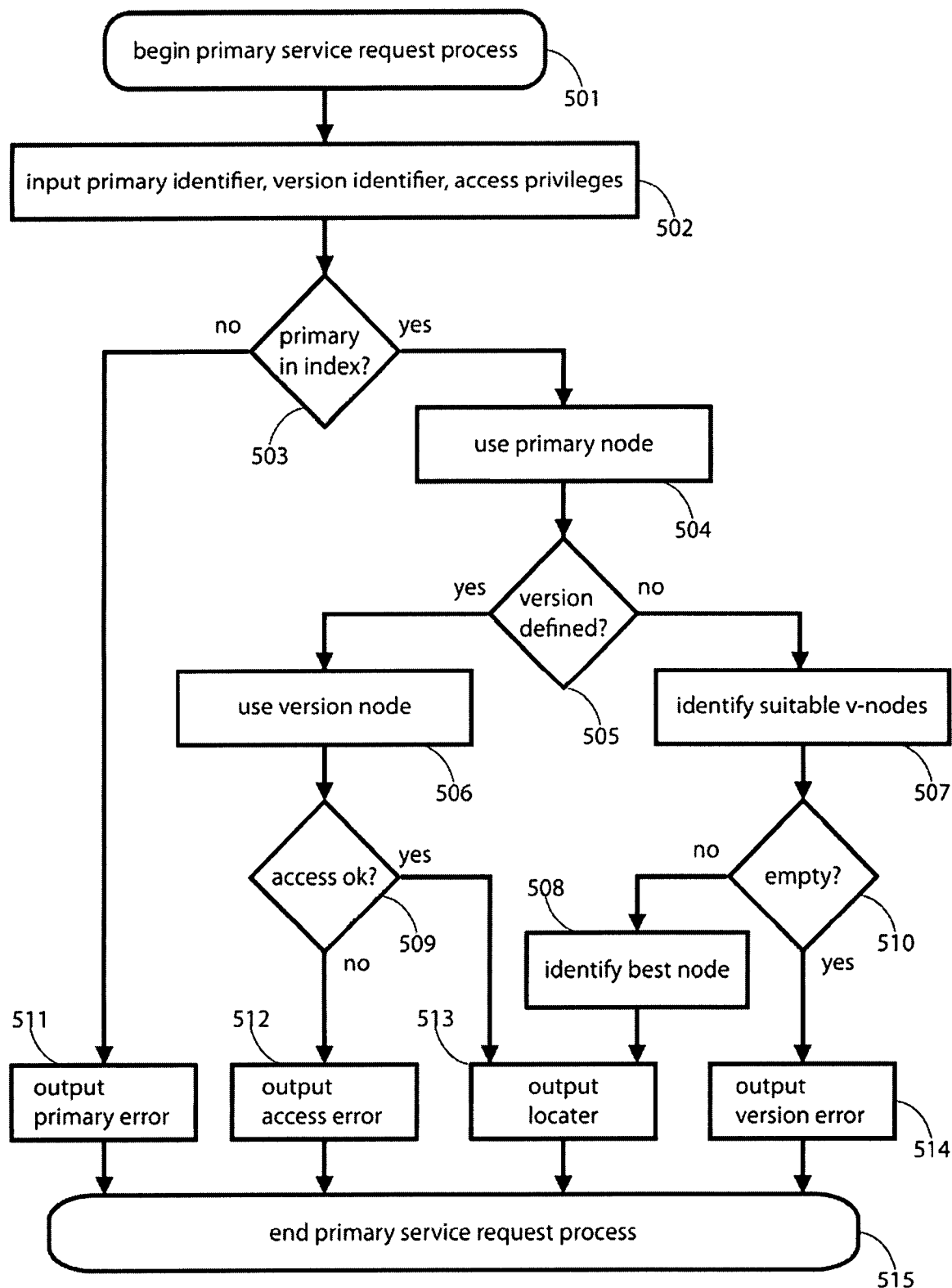
FIG. 5 is an example flowchart for an example primary service request.

FIG. 5 is a flowchart representing an example primary service request process consisting of a number of software steps, assuming the data structure of FIG. 3. The primary service request process parses user input to determine a primary song identifier, a song version identifier (if any), and user access privileges (if any) in step 502. The master index is searched for the primary node corresponding to the song identifier. The status of the search process is monitored in step 503. If the search is successful, the primary node is used as the starting address in step 504; otherwise, the song is not in the master index, and a no-such-song error message is output in step 511. When the search is successful, a primary node is identified in step 504, and the service request is checked for a song version identifier in step 505.

If a version is defined in the service request, the version node is used as the secondary address in step 506, and access privileges are checked in step 509. If the user is privileged to access the requested version, the location of that version is output in step 513; otherwise, an insufficient-access error message is output in step 512.

In an alternate embodiment, a primary service request process accepts requests in a mode without user identified access privileges. In response, the service request process may provide an alternate locator consisting of a password-enabled or encrypted locater in step 512. In this mode, the check of user access privileges is postponed until the user attempts to access the media object's location. For example, a user of Yahoo! Music Engine® (YME) may be provided a YME network location that is unlocked using a YME access control mechanism.

If the song version is not identified in the service request, the service provider determines a version, and step 505 proceeds to step 507. In step 507, a list of suitable version nodes for the user is determined. The list is checked in step 510. If the list is empty, a no-available-version error message is output in step 514; otherwise the best node in the list identifies a best or a default version in step 508. The location of that version is output in step 513.

Figure 6:
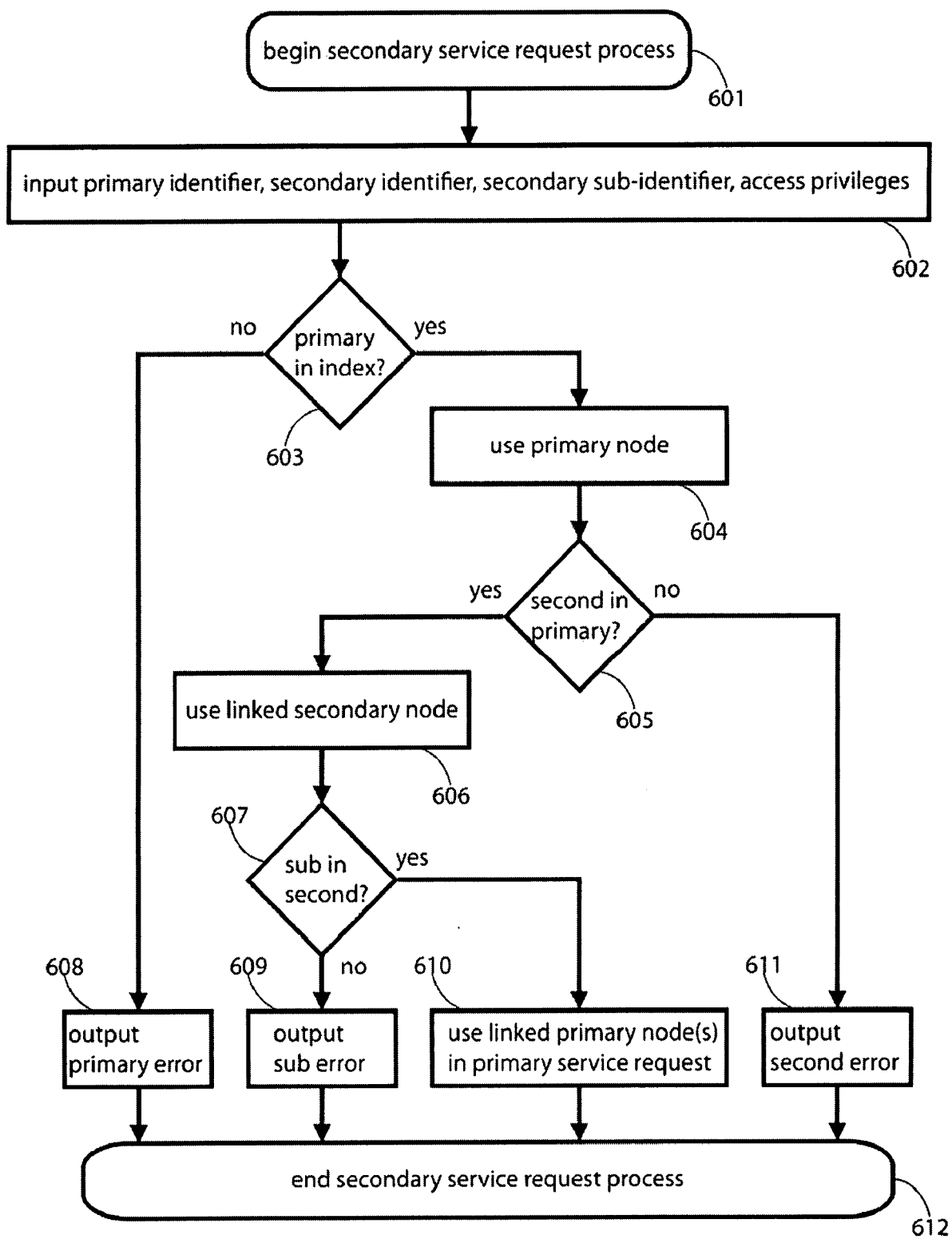
FIG. 6 is an example flowchart for an example secondary service request.

FIG. 6 is a flowchart representing an example secondary service request process consisting of a number of software steps. In the request, the user identifies a song with a desired attribute, and the index produces the location of another song with the desired attribute. The secondary service request process parses user input to determine a primary song identifier, a secondary identifier, a secondary sub-identifier (if any) and user access privileges (if any) in step 602. The master index is searched for the primary node corresponding to the song identifier. The status of the search process is monitored in step 603. If the search is successful, the primary node is used as the starting address in step 604; otherwise, the song is not in the master index, and a no-such-song error message is output in step 608. When the search is successful, a primary node is identified in step 604, and the secondary attribute identifier of the service request is checked in step 605.

If the checked secondary attribute is linked to the primary node, a link for the secondary attribute is in the primary node's links, and the link for the secondary attribute is used to access the secondary attribute node in step 606; otherwise, an error message is output to the user in step 611. If a secondary sub-identifier is supplied in the secondary service request, the secondary sub-identifier is checked in step 607.

In one implementation, the secondary sub-identifier identifies a specific song. For didactic purposes, consider that a user may desire a specific song consisting of the next song in the Lyle Lovett album Pontiac after If I had a Boat. The secondary service request consists of the primary identifier, If had a Boat performed by Lyle Lovett corresponding to P[i], a secondary attribute identifier, the album Pontiac corresponding to a[2], a secondary sub-identifier for next-in-album, and the user access privileges. Processing the request proceeds through to steps 607. At step 607, the flowchart determines whether there is a next-in-album song, and if not, outputs a last-in-album error message to the user in step 609. If, however, there is a next-in-album song, the flowchart proceeds to step 610. A primary service request for a version of song P[j] with the user access privileges is formed in step 610. Proceeding with the primary service request as shown in FIG. 5, the primary service requests attempts to determine a best network location for the next song on Pontiac, the song Give Back My Heart, which is output to the user.

In an optional mode of operation, the master index is used to find a list of one or more songs related to an identified song. In this case, the secondary sub-identifier is null and the secondary service request attempts to provide the location of the songs related by the secondary attribute in the secondary service request. For didactic purposes, consider that a user may desire to access the set of songs in the Lyle Lovett album Pontiac. The secondary service request consists of the primary identifier, If I had a Boat performed by Lyle Lovett corresponding to P[i], a secondary attribute identifier, the album Pontiac corresponding to a[2], a null secondary sub-identifier, and the user access privileges. Processing the request in FIG. 6 proceeds through steps 603 to 607. In this mode, the sub-identifier is null, and the null identifier is considered a member of a non-empty list of linked nodes in step 607. If there are primary nodes linked by the secondary attribute node, a primary service request is generated for one or more of the linked songs, as for example {P[g], P[h], . . . , P[z] } in FIG. 3, with the user access privileges in step 610. In an example secondary attribute request for this mode, the user requests "all songs for the secondary attribute, the album Pontiac." Proceeding with the primary service request as shown in FIG. 5, the primary service requests attempts to determine a best network location for all of the songs in the album Pontiac, each of which is output to the user.

Figure 7:
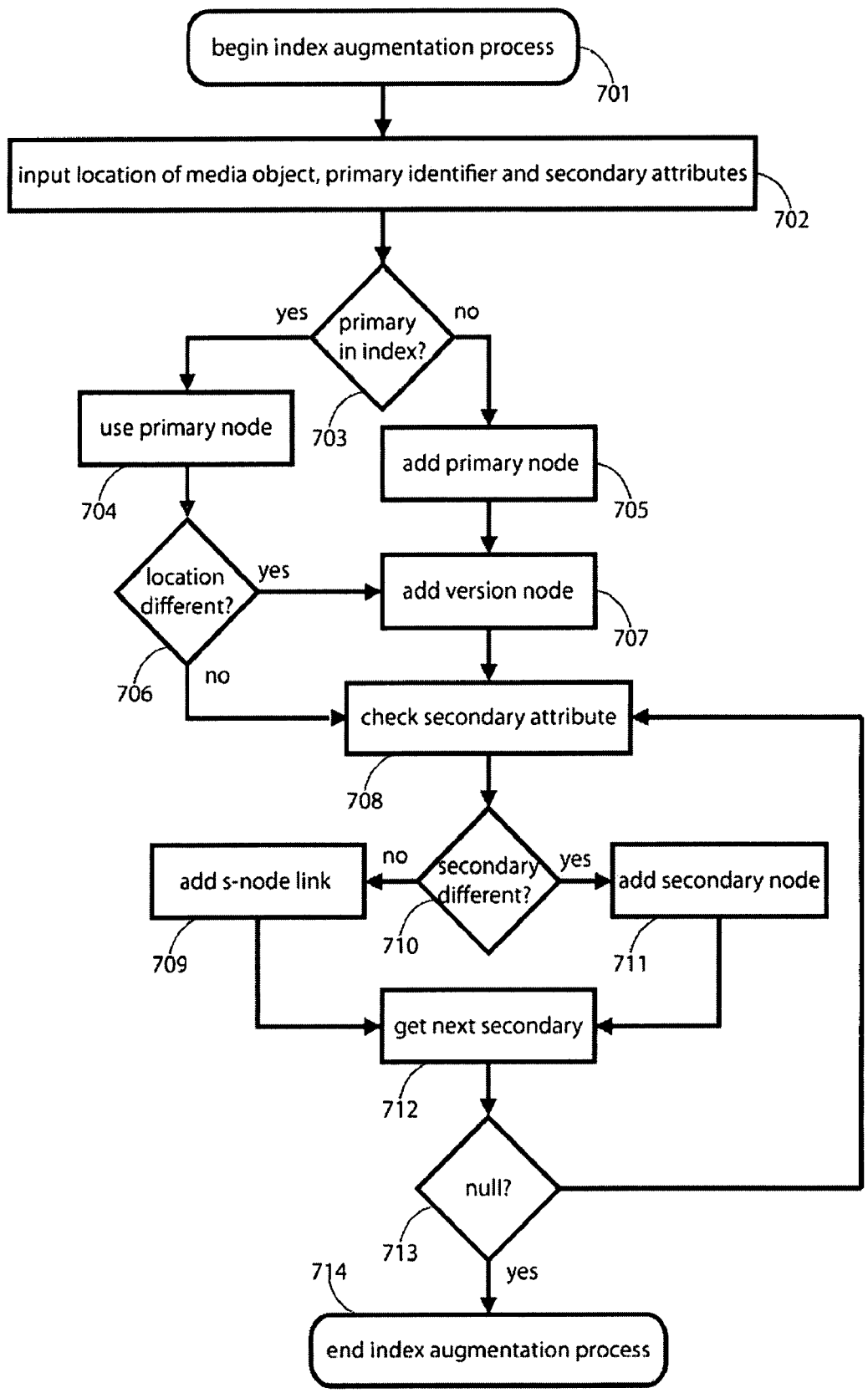
FIG. 7 is an example flowchart for an index entry augmentation service request.

FIG. 7 is a flowchart of an example master index augmentation process for a new entry. The input to the augmentation process is parsed in step 702 to determine a location of the new media object, its primary identifier, and one or more secondary attributes.

In step 703, the master index is searched for the primary identifier, and if found, the primary node is used in step 704; otherwise, the primary node needs to be added in step 705, and a version node needs to be added in step 707. When the primary node already exists in step 703, it is used to compare one or more network locations to the augmentation process location in step 706. If the process location is different than the known locations, a version node is added in step 707; otherwise, the song and version are already in the index. Steps 706 and 707 proceed to step 708 to move on to secondary attributes.

In step 708, it is assumed that each song has at least one secondary attribute. In one implementation, one or more secondary attributes may be dynamically generated [not shown]. For example, in the index augmentation process, a new song may automatically trigger a check of primary identifier sub-identifiers as possible secondary attributes. An example new entry in the master index may add a primary node locating the song "Lyle Lovett performing If I Had a Boat." The index augmentation process may dynamically determine a secondary attribute representing songs by the performer Lyle Lovett and add an appropriate secondary attribute node.

In step 708, a secondary attribute for the augmentation process is checked. If the secondary attribute is not in the list of existing secondary attributes for the primary identifier, the flowchart proceeds from step 710 to step 709 to add a secondary attribute link to a new primary identifier if needed. Otherwise; a secondary attribute of the new entry is different from existing secondary attributes, and a secondary node is added in step 711. In steps 712, the next secondary attribute of the new entry is accessed. If the list is exhausted, the next attribute is iiull and the augmentation process terminates 714. Otherwise, the next secondary attribute is processed in a similar manner to the preceding secondary attribute in steps 708-712.

Figure 8:
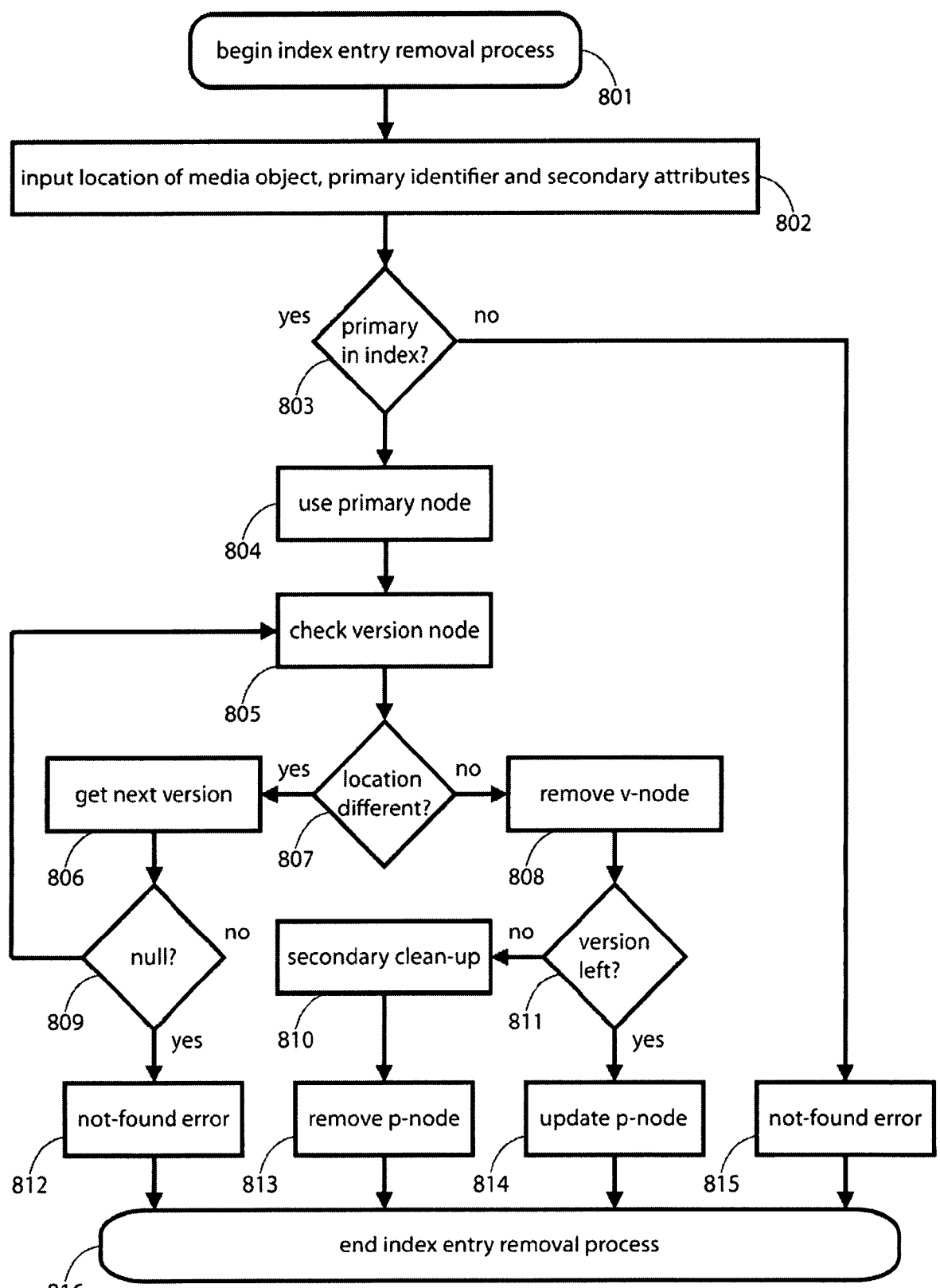
FIG. 8 is an example flowchart for an index entry removal service request.

FIG. 8 is a flowchart of an example master index removal process for an existing entry. The input to the augmentation process is parsed in step 802 to determine a location of the existing media object, its primary identifier, and secondary attributes (if any).

In step 803, the master index is searched for the primary identifier, and if found, the primary node is used in step 804; otherwise, the song is not in the master index and an error message is generated in step 815. When the primary node already exists in step 803, it is used to identify the version nodes in step 805. In step 807, a network location of a version is compared to the removal process location. If the process location is different than the known location, a series next version node is checked in steps 806, 809, 805, and 807. This loop continues until the entry removal location matches a version node location in step 807, or the list of versions is exhausted and an error message is generated in step 812.

When a matching version location is found in step 807, the offending version node is removed in step 808. In step 811, the primary node is checked to ensure that at least one version remains. If so, the primary node is updated to remove the link to the removed version node in step 814, and the process terminates 816. Otherwise, the removed location is the last version of the song, and all secondary attribute nodes pointing to the primary node must be updated in step 810. When the clean up process is complete, the primary node is deleted in step 813 and the process terminates.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method comprising:
maintaining, in a data store, a set of unique compositions, each of the compositions defined by one or more primary concept attributes describing a concept of each composition, wherein the one or more primary concept attributes comprise a title of the composition;
associating, by a processor, one or more media objects with one of the compositions defined by one or more primary concept attributes, wherein each of said media objects is regarded as a version of the one composition;
associating, by the processor, one or more secondary attributes with the one of the compositions defined by the one or more primary concept attributes;
maintaining a searchable index of the primary concept attributes, the versions, and the secondary attributes; and
in response to a request from a remote host for a location of one of said media objects,
  accessing the searchable index to determine a primary node corresponding to the primary concept attribute for the media object;
  determining, from the primary node, one or more version nodes, wherein the one or more version nodes are connected to the primary node and each primary node comprises metadata and an address of one or more of the version nodes;
  determining, from the primary node, one or more secondary attribute nodes, wherein the one or more secondary attribute nodes are connected to the primary node or other secondary attribute nodes;
  determining, from the one or more version nodes, a network locater for the one or more versions;
  determining, from the primary node, one or more alternate version nodes, wherein the one or more alternate version nodes are connected to the primary node;
  determining, for the one or more alternate version nodes, a network locater for the one or more alternate versions; and
  transmitting the network locater for the one or more versions or the network locater for the one or more alternate versions to the remote host.

2. The method of claim 1, wherein the primary concept attribute of a composition further comprises a composition performer.

3. The method of claim 1, wherein the request from a remote host comprises a request for an identified copy of said media object, wherein the request for the identified copy further comprises
  accessing a primary node associated with the primary concept attribute for the media object;
  determining, from the requester's identification of the copy, an associated version node;
  determining access requirements for the associated version node;
  determining, from the request, one or more requester access privileges;
  determining that the requester access privileges meet the access requirements for the associated version node; and
  transmitting the one or more network locaters to the remote host.

4. The method of claim 1, wherein the primary concept attribute of a composition consists of the composition title, the composition composer, and the composition performer.

5. The method of claim 1, further comprising
determining one or more requester access privileges;
determining one or more access requirements of a version; and
restricting access to the version to enforce the version access privileges.

6. A computing device comprising:
a processor;
a memory for storing an index of media objects, each of said media objects related to compositions and accessible on a network, the memory comprising:
  a plurality of primary nodes, each primary node representing a unique composition and defined by a primary concept attribute describing a concept of the composition, wherein the one or more primary concept attributes comprise a title of the composition;
  one or more secondary attributes associated with the composition defined by the primary concept attributes;
  for each primary node, a version data structure containing one or more version nodes, each of said version nodes linked from the primary node and representing an accessible copy of the unique composition;
  one or more secondary attribute nodes determined from the each primary node, wherein the one or more secondary attribute nodes are connected to the each primary node or other secondary attribute nodes; and
  for each version node representing an accessible copy of the unique composition, data including a pointer representing a network locater for the accessible copy;
  one or more alternate version nodes, determined from the each primary node, the one or more alternate version nodes connected to the each primary node; and
  for the one or more alternate version nodes, data including a pointer representing a network locater for the one or more alternate versions,
  wherein each primary node comprises metadata and an address of one or more of the version nodes.

7. The computing device according to claim 6, wherein a primary node includes one or more addresses of version nodes.

8. The computing device according to claim 6, wherein a primary node comprises a pointer representing a network locater for a default accessible copy and one or more addresses of alternate version nodes.

9. The computing device according to claim 6, wherein a version node comprises a link returning to the primary node.

10. A method comprising:
maintaining, in a data store, a set of unique compositions, each of the compositions defined by one or more primary concept attributes describing a concept of each composition, wherein the one or more primary concept attributes comprise a title of the composition;
associating, by a processor, one or more media objects with one of the compositions defined by one or more primary concept attributes, wherein each of said media objects is regarded as a version of the one composition;
associating each of the compositions defined by one or more primary concept attributes with one or more secondary attributes;
maintaining a searchable index of the primary concept attributes, the versions, and the secondary attributes; and
in response to a request from a remote host for a location of a media object related to an identified media object by one or more identified secondary attributes, accessing the searchable index to determine a primary node associated with the primary attribute for the identified media object;

determining, from the primary node, one or more version nodes, wherein the one or more version nodes are connected to the primary node and wherein each primary node comprises metadata and an address of one or more of the version nodes;

determining, from the primary node, one or more secondary attribute nodes, wherein the one or more secondary attribute nodes are connected to the primary node or other secondary attribute nodes;

determining, for the one or more secondary attribute nodes, one or more linked primary nodes;

determining, from the one or more linked primary nodes, one or more version nodes, wherein the one or more version nodes are connected to the one or more linked primary nodes;

determining, from the one or more version nodes, a network locater for the one or more versions; and transmitting the one or more network locaters to the remote host.

11. The method of claim 10, wherein a secondary node is associated with a common characteristic of more than one media object.

12. The method of claim 10, wherein a secondary node is dynamically generated by determining a common characteristic shared by more than one media object.

13. A computing device comprising:

a memory for storing an index of media objects, each of said media objects related to compositions and accessible on a network, the memory comprising:

a plurality of primary nodes, each primary node representing a unique composition and defined by a primary concept attribute data structure describing a concept of the composition, wherein the one or more primary concept attributes comprise a title of the composition;

for each primary node, a version data structure including one or more version nodes, each of said version nodes representing an accessible copy of the unique composition linked from the primary node;

for each version node representing an accessible copy of the unique composition, data including a pointer representing a network locater for the accessible copy, and for each primary node, a secondary attribute data structure, said secondary attribute data structure including one or more secondary attribute nodes, each of said secondary attribute nodes linked from the primary node and including links to one or more associated primary nodes;

one or more alternate version nodes, determined from the each primary node, the one or more alternate version nodes connected to the each primary node; and for the one or more alternate version nodes, data including a pointer representing a network locater for the one or more alternate version nodes, wherein each primary node comprises metadata and an address of one or more of the version nodes.

14. The computing device according to claim 13, wherein a secondary attribute node is linked to a common characteristic of more than one unique composition.

15. The computing device according to claim 13, wherein a secondary attribute node is linked to one or more other secondary attribute nodes.

16. The computing device according to claim 13, wherein one or more secondary attribute nodes is dynamically generated by determining one or more characteristics of the primary node.

* * * * *